(12) United States Patent
Otenko

(10) Patent No.: US 9,378,045 B2
(45) Date of Patent: Jun. 28, 2016

(54) SYSTEM AND METHOD FOR SUPPORTING COOPERATIVE CONCURRENCY IN A MIDDLEWARE MACHINE ENVIRONMENT

(71) Applicant: Oracle International Corporation, Redwood Shores, CA (US)

(72) Inventor: Oleksandr Otenko, Winnersh (GB)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 441 days.

(21) Appl. No.: 13/781,475

(22) Filed: Feb. 28, 2013

(65) Prior Publication Data

US 2014/0245312 A1 Aug. 28, 2014

(51) Int. Cl.
*G06F 9/46* (2006.01)
*G06F 9/52* (2006.01)
*G06F 9/54* (2006.01)

(52) U.S. Cl.
CPC *G06F 9/46* (2013.01); *G06F 9/524* (2013.01); *G06F 9/526* (2013.01); *G06F 9/546* (2013.01)

(58) Field of Classification Search
None
See application file for complete search history.

(56) References Cited

U.S. PATENT DOCUMENTS

| 5,109,384 | A | 4/1992 | Tseung | |
|---|---|---|---|---|
| 6,449,614 | B1 * | 9/2002 | Marcotte | |
| 6,874,144 | B1 * | 3/2005 | Kush | 718/103 |
| 6,895,590 | B2 | 5/2005 | Yadav | |
| 6,938,085 | B1 | 8/2005 | Belkin et al. | |
| 7,046,676 | B2 * | 5/2006 | Goetzinger et al. | 370/395.4 |
| 7,554,993 | B2 | 6/2009 | Modi et al. | |
| 7,685,391 | B1 * | 3/2010 | Cholleti et al. | 711/165 |
| 7,761,617 | B2 * | 7/2010 | Seigneret et al. | 710/22 |
| 7,876,677 | B2 | 1/2011 | Cheshire | |
| 7,991,904 | B2 | 8/2011 | Melnyk et al. | |
| 8,130,776 | B1 | 3/2012 | Sundararajan | |
| 8,131,860 | B1 | 3/2012 | Wong et al. | |
| 8,255,914 | B1 * | 8/2012 | Joyce et al. | 718/103 |
| 8,347,302 | B1 | 1/2013 | Vincent et al. | |
| 8,504,691 | B1 * | 8/2013 | Tobler et al. | 709/226 |
| 8,539,486 | B2 * | 9/2013 | Cain et al. | 718/100 |
| 8,578,033 | B2 | 11/2013 | Mallart | |
| 8,850,441 | B2 * | 9/2014 | Allen | 718/103 |
| 8,863,136 | B2 * | 10/2014 | Allen | 718/103 |
| 8,918,791 | B1 | 12/2014 | Chudgar et al. | |
| 8,930,584 | B2 * | 1/2015 | Otenko et al. | 710/5 |
| 2001/0034753 | A1 | 10/2001 | Hildebrand et al. | |

(Continued)

FOREIGN PATENT DOCUMENTS

WO 2012084835 6/2012

OTHER PUBLICATIONS

European Patent Office, International Searching Authority, International Search Report and Written Opinion dated Mar. 14, 2014 for International Application No. PCT/US2013/067108, 12 pages.

(Continued)

*Primary Examiner* — Van Nguyen
(74) *Attorney, Agent, or Firm* — Tucker Ellis LLP

(57) ABSTRACT

A system and method can support cooperative concurrency in a priority queue. The priority queue, which includes a calendar ring and a fast lane, can detect one or more threads that contend to claim one or more requests in the priority queue. Then, a victim thread can place a request in the fast lane in the priority queue, and release a contending thread, which proceeds to consume the request in the fast lane.

20 Claims, 10 Drawing Sheets

(56) References Cited

U.S. PATENT DOCUMENTS

| | | | |
|---|---|---|---|
| 2002/0143847 A1 | 10/2002 | Smith | |
| 2002/0174136 A1 | 11/2002 | Cameron et al. | |
| 2003/0014480 A1 | 1/2003 | Pullara et al. | |
| 2003/0053469 A1 | 3/2003 | Wentink | |
| 2003/0078958 A1 | 4/2003 | Pace et al. | |
| 2003/0081544 A1* | 5/2003 | Goetzinger et al. | 370/229 |
| 2003/0110232 A1 | 6/2003 | Chen | |
| 2003/0120822 A1 | 6/2003 | Langrind et al. | |
| 2004/0177126 A1 | 9/2004 | Maine | |
| 2004/0205771 A1 | 10/2004 | Sudarshan et al. | |
| 2005/0021354 A1 | 1/2005 | Brendle et al. | |
| 2005/0038801 A1 | 2/2005 | Colrain et al. | |
| 2005/0094577 A1 | 5/2005 | Ashwood-Smith | |
| 2005/0102412 A1 | 5/2005 | Hirsimaki | |
| 2005/0262215 A1 | 11/2005 | Kirov et al. | |
| 2005/0283577 A1 | 12/2005 | Sivaram et al. | |
| 2006/0015600 A1 | 1/2006 | Piper | |
| 2006/0015700 A1 | 1/2006 | Burka | |
| 2006/0031846 A1 | 2/2006 | Jacobs et al. | |
| 2006/0143525 A1 | 6/2006 | Kilian | |
| 2006/0176884 A1 | 8/2006 | Fair | |
| 2006/0209899 A1 | 9/2006 | Cucchi et al. | |
| 2006/0230411 A1* | 10/2006 | Richter et al. | 719/328 |
| 2006/0294417 A1 | 12/2006 | Awasthi et al. | |
| 2007/0118601 A1 | 5/2007 | Pacheco | |
| 2007/0156869 A1 | 7/2007 | Galchev et al. | |
| 2007/0198684 A1 | 8/2007 | Mizushima | |
| 2007/0203944 A1 | 8/2007 | Batra et al. | |
| 2007/0263650 A1 | 11/2007 | Subramania et al. | |
| 2008/0044141 A1 | 2/2008 | Willis et al. | |
| 2008/0098458 A2 | 4/2008 | Smith | |
| 2008/0140844 A1 | 6/2008 | Halpern | |
| 2008/0286741 A1 | 11/2008 | Call | |
| 2009/0034537 A1 | 2/2009 | Colrain et al. | |
| 2009/0150647 A1 | 6/2009 | Mejdrich et al. | |
| 2009/0172636 A1 | 7/2009 | Griffith | |
| 2009/0182642 A1 | 7/2009 | Sundaresan | |
| 2009/0327471 A1 | 12/2009 | Astete et al. | |
| 2010/0082855 A1 | 4/2010 | Accapadi et al. | |
| 2010/0100889 A1 | 4/2010 | Labrie et al. | |
| 2010/0198920 A1 | 8/2010 | Wong et al. | |
| 2010/0199259 A1 | 8/2010 | Quinn | |
| 2010/0278190 A1 | 11/2010 | Yip et al. | |
| 2011/0029812 A1 | 2/2011 | Lu et al. | |
| 2011/0055510 A1 | 3/2011 | Fritz et al. | |
| 2011/0071981 A1 | 3/2011 | Ghosh et al. | |
| 2011/0119673 A1 | 5/2011 | Bloch et al. | |
| 2011/0153992 A1 | 6/2011 | Srinivas et al. | |
| 2011/0161457 A1 | 6/2011 | Sentinelli | |
| 2011/0231702 A1 | 9/2011 | Allen et al. | |
| 2012/0023557 A1 | 1/2012 | Bevan | |
| 2012/0054472 A1 | 3/2012 | Altman et al. | |
| 2012/0066400 A1 | 3/2012 | Reynolds | |
| 2012/0066460 A1 | 3/2012 | Bihani | |
| 2012/0158684 A1 | 6/2012 | Lowenstein et al. | |
| 2012/0218891 A1 | 8/2012 | Sundararajan | |
| 2012/0239730 A1 | 9/2012 | Revanuru | |
| 2013/0004002 A1 | 1/2013 | Duchscher | |
| 2013/0132970 A1 | 5/2013 | Miyoshi | |
| 2013/0145373 A1 | 6/2013 | Noro | |
| 2013/0304848 A1 | 11/2013 | Lyle et al. | |

OTHER PUBLICATIONS

Baldwin, Richard G., "The ByteBuffer Class in Java", Aug. 20, 2012, 14 pages. Retrieved from : <http://www.developer.com/author/Richard-G.-Baldwin-64720.htm>.

European Patent Office, International Searching Authority, International Search Report and Written Opinion dated Mar. 6, 2014 for International Application No. PCT/US2013/067106, 11 pages.

Office Action issued by United States Patent and Trademark Office for U.S. Appl. No. 13/781,500, mailed May 9, 2016 (14 pages).

Office Action issued by United States Patent and Trademark Office for U.S. Appl. No. 14/167,792, mailed May 12, 2016 (9 pages).

* cited by examiner

SYSTEM AND METHOD FOR SUPPORTING COOPERATIVE CONCURRENCY IN A MIDDLEWARE MACHINE ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent applications, each of which is hereby incorporated by reference in its entirety:

U.S. Patent Application entitled "SYSTEM AND METHOD FOR USING A SEQUENCER IN A CONCURRENT PRIORITY QUEUE", application Ser. No. 13/781,493, filed Feb. 28, 2013, by inventor Oleksandr Otenko, and subsequently granted as U.S. Pat. No. 9,110,715 issued on Aug. 18, 2015;

U.S. Patent Application entitled "SYSTEM AND METHOD FOR TRANSFORMING A QUEUE FROM NON-BLOCKING TO BLOCKING", application Ser. No. 13/781,500, filed Feb. 28, 2013, by inventor Oleksandr Otenko, which is currently pending.

FIELD OF INVENTION

The present invention is generally related to computer systems and software such as middleware, and is particularly related to systems and methods for supporting queue in a middleware machine environment.

BACKGROUND

Within any large organization, over the span of many years, the organization often finds itself with a sprawling IT infrastructure that encompasses a variety of different computer hardware, operating systems, and application software. Although each individual component of such infrastructure might itself be well-engineered and well-maintained, when attempts are made to interconnect such components, or to share common resources, it is often a difficult administrative task. In recent years, organizations have turned their attention to technologies such as virtualization and centralized storage, and even more recently cloud computing, which can provide the basis for a shared infrastructure. However, there are few all-in-one platforms that are particularly suited for use in such environments. These are the general areas that embodiments of the invention are intended to address.

SUMMARY

Systems and methods are provided for supporting cooperative concurrency in a priority queue. The priority queue, which includes a calendar ring and a fast lane, can detect one or more threads that contend to claim one or more requests in the priority queue. Then, a victim thread can place the request in the fast lane in the priority queue, and release a contending thread, which proceeds to consume the request in the fast lane.

Other objects and advantages of the present invention will become apparent to those skilled in the art from the following detailed description of the various embodiments, when read in light of the accompanying drawings.

DETAILED DESCRIPTION

Described herein are systems and methods that can support cooperative concurrency in a middleware machine environment.

Figure 1:
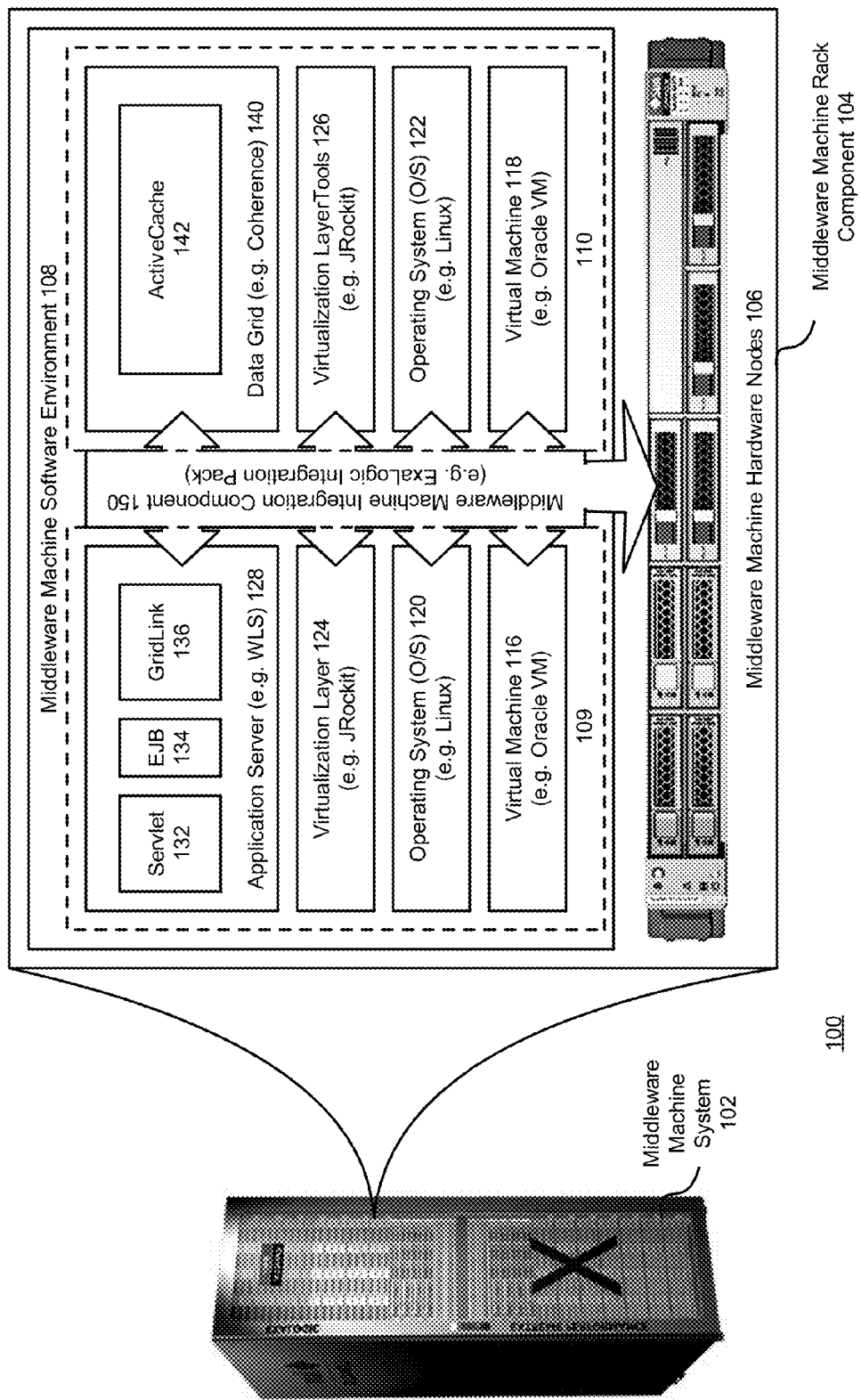
FIG. 1 shows an illustration of a middleware machine environment 100, in accordance with an embodiment of the invention.

FIG. 1 shows an illustration of a middleware machine environment 100, in accordance with an embodiment of the invention. As shown in FIG. 1, each middleware machine system 102 includes several middleware machine rack components 104, each of which includes a combination of high-performance middleware machine hardware nodes 106 (e.g., 64-bit processors, high performance large memory, and redundant InfiniBand and Ethernet networking), and a middleware machine software environment 108. The result is a complete application server environment which can be provisioned in minutes rather than days or months, and which can scale on demand. In accordance with an embodiment, each middleware machine system can be deployed as a full, half, or quarter rack, or other configuration of rack components, and several middleware machine systems can be coupled together, again using InfiniBand, to create larger environments. Each middleware machine software environment can be provisioned with several application server or other software instances. For example as shown in FIG. 1, an application server instance 109 could comprise a virtual machine 116, operating system 120, virtualization layer 124, and application server layer 128 (e.g. WebLogic, including servlet 132, EJB 134, and Gridlink 136 containers). Another application server instance 110 could comprise a virtual machine 118, operating system 122, virtualization layer 126, and data grid layer 140 (e.g. Coherence, including an active cache 142). Each of the instances can communicate with one another, and with both its middleware machine hardware node, and other nodes, using a middleware machine integration component 150, such as an ExaLogic integration pack, which itself provides several optimization features, such as support for InfiniBand and other features, as described in further detail below.

Figure 2:
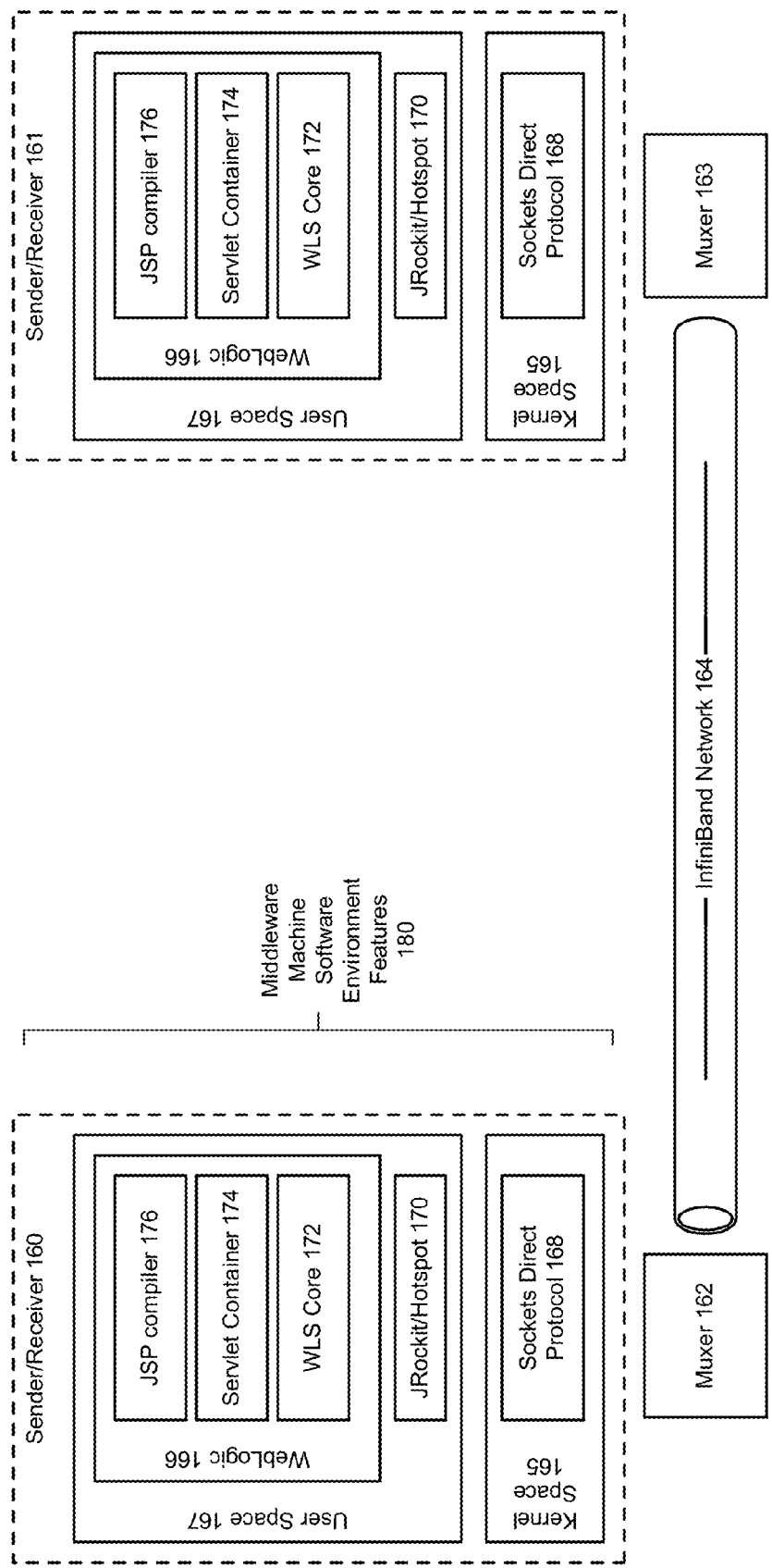
FIG. 2 shows another illustration of a middleware machine platform or environment, in accordance with an embodiment of the invention.

FIG. 2 shows another illustration of a middleware machine platform or environment, in accordance with an embodiment of the invention. As shown in FIG. 2, each application server instance can act as a sender and/or receiver 160, 161 within the middleware machine environment. Each application server instance is also associated with a muxer 162, 163, that allows the application servers to communicate with one another via an InfiniBand network 164. In the example shown in FIG. 2, an application server instance can include a kernel space 165, user space 167, and application server (e.g. WebLogic space) 166, which in turn can be associated with a sockets direct protocol 168, a JVM (e.g. JRockit/Hotspot layer) 170, a WLS core 172, a servlet container 174, and a JSP compiler 176. In accordance with other examples, other combinations of middleware-type software can be included. In accordance with various embodiments, the machine integration component can provide features 180 such as Zero Buffer Copies, Scatter/Gather I/O, T3 Connections, Lazy Deserialization, and GridLink DataSource, to provide the basis for, and improve performance within, the shared infrastructure.

Priority Queue

In accordance with various embodiments of the invention, a concurrent system can use a priority queue to prioritize incoming requests in order to provide service with an appropriate service level agreement (SLA).

Figure 3:
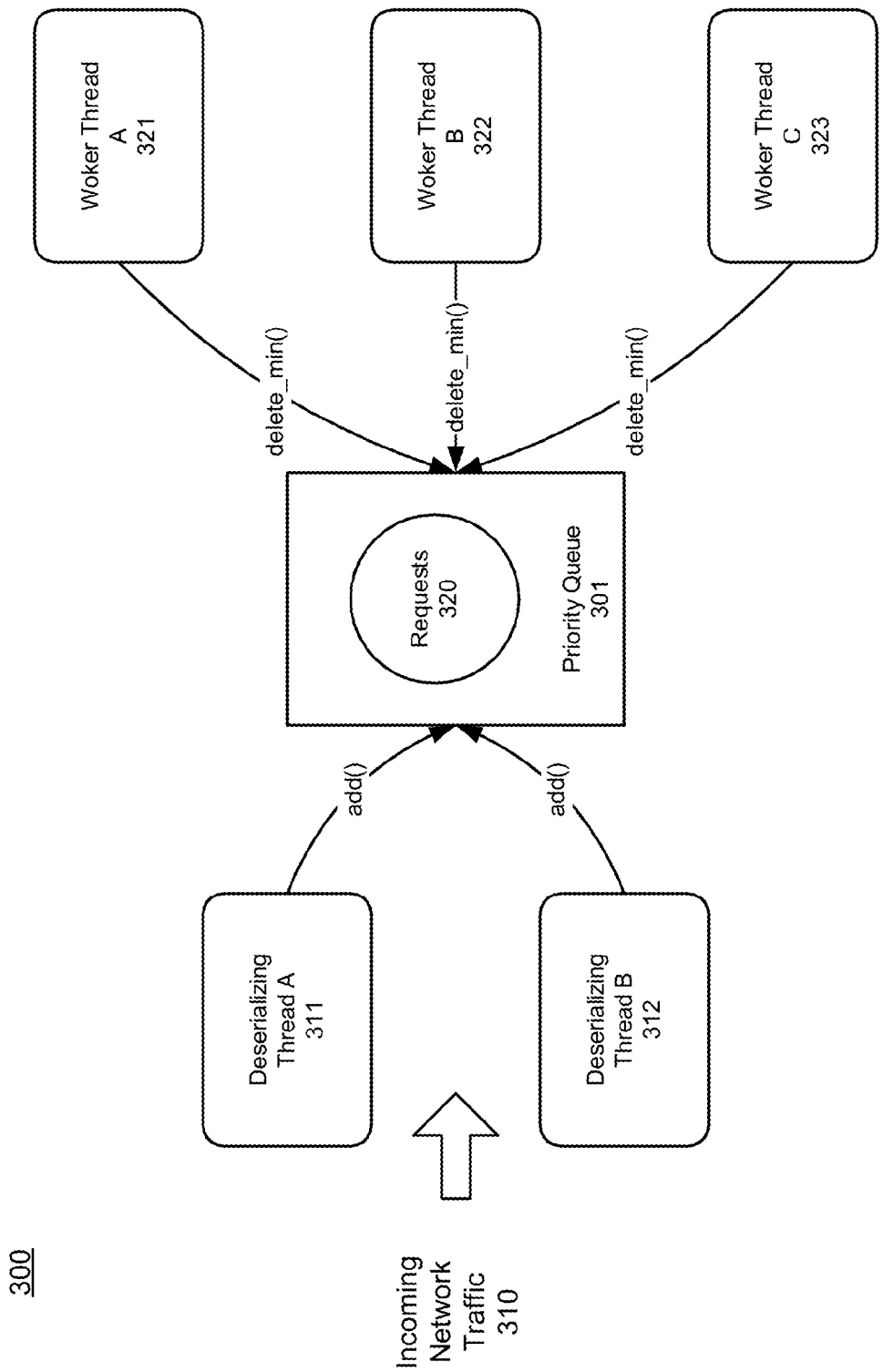
FIG. 3 shows an illustration of using a priority queue for handling requests in a middleware machine environment, in accordance with various embodiments of the invention.

FIG. 3 shows an illustration of using a priority queue for handling requests in a middleware machine environment, in accordance with various embodiments of the invention. As shown in FIG. 3, one or more threads, e.g. deserializing threads A-B 311-312, can deserialize the incoming network traffic 310 that contains one or more requests 320. The deserializing threads A-B 311-312 can place the requests 320 in a priority queue 301, e.g. using add( ) methods. Then, a plurality of worker threads, e.g. worker threads A-C 321-323, can access the priority queue 301 concurrently and can claim the requests 320, e.g. using delete_min( ) methods.

The priority queue 301 can be designed to meet demanding concurrency criteria, so that the interaction between the contenders does not cause degradation in the throughput of the system as a whole. Additionally, the priority queue 301 can be implemented to have a fixed memory footprint, so that the JVM is able to better optimize its operations on fixed-size arrays of primitives, and can achieve substantial cache efficiency.

In accordance with various embodiments of the invention, the priority queue 301 can be implemented based on a calendar queue, e.g. the calendar queue provided in the WebLogic Application Server. The calendar queue can include a calendar with multiple buckets, each of which can store events that fall within a particular slice of time. For example, the multiple buckets can be sorted and arranged by comparing the target service time with a current time. If the difference in time is in the first byte, then the request can be stored in a bucket in the first 256 buckets. The specific bucket can be chosen using the actual value of the target time for executing the request. Furthermore, if the difference in time is in the second byte, then the request can be stored in a bucket in the second 256 buckets.

When a consumer, e.g. via one of the worker threads A-C 321-323, tries to remove the next request that is configured to be execute the earliest, the system can scan the calendar for the first bucket that is not empty. If this bucket is not one of the first 256 buckets, then the calendar queue can use a loop and promote method to move the requests to the buckets "one level down" toward the first 256 buckets. Eventually, some requests can be promoted to one or more buckets in the first 256 buckets, and the consumer can claim a request and proceed accordingly.

The above promotion process can involve logarithmic cost, which may have an impact on the overall performance of the system. Additionally, there can be other designs for the calendar queue, the performance of which may be limited to a choice between "O(1) add, O(log N) delete_min," and "O(log N) add, O(1) delete_min."

Figure 4:
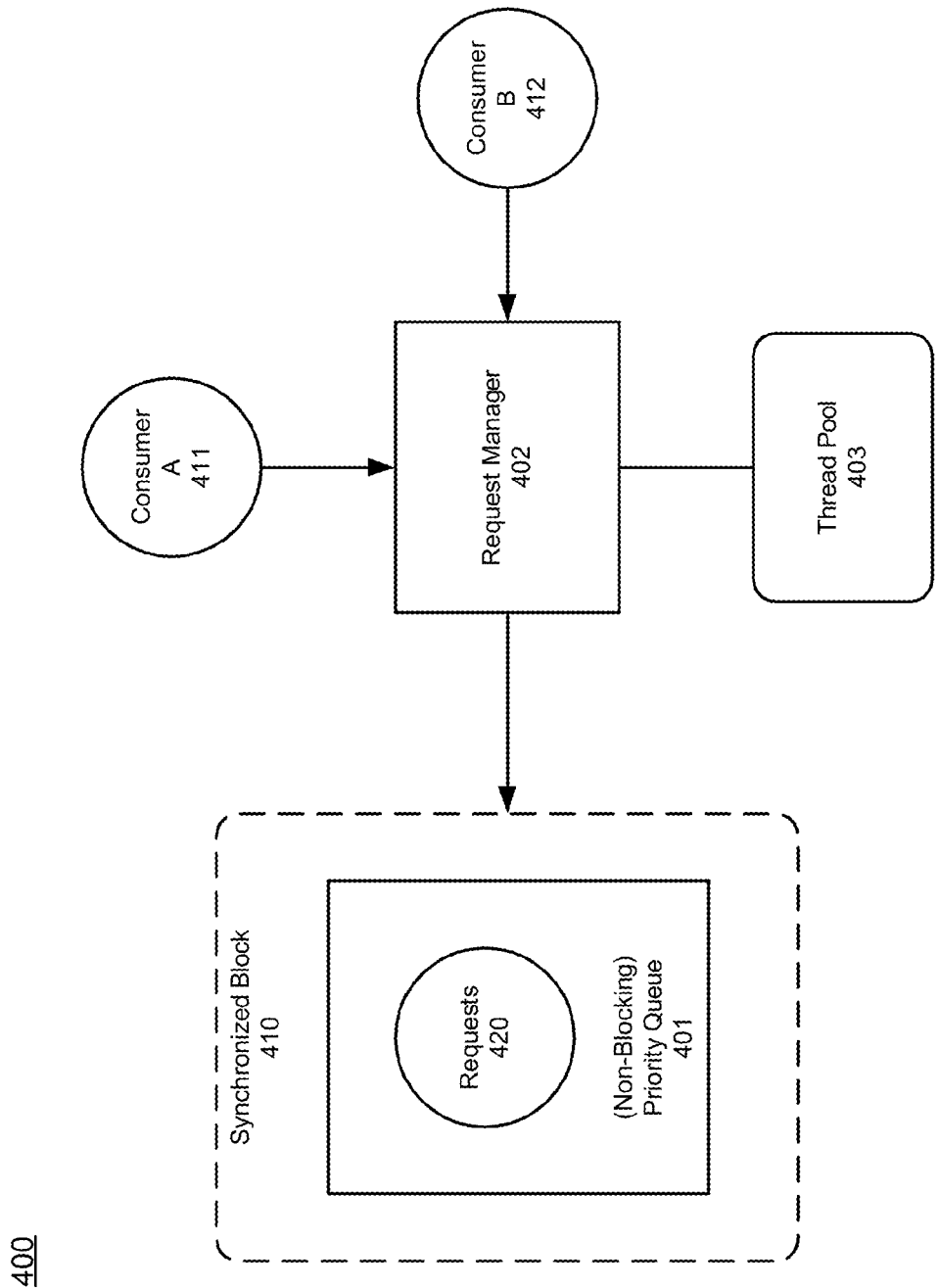
FIG. 4 shows an illustration of supporting a non-blocking queue in a middleware machine environment.

FIG. 4 shows an illustration of supporting a non-blocking queue in a middleware machine environment. As shown in FIG. 4, a plurality of consumers, e.g. consumers A-B 411-412, can concurrently access a priority queue 401 in a middleware machine environment 400. The priority queue 401 can be implemented as a non-blocking queue and can be accessed via a request manager 402.

The request manager 402, which manages a thread pool 403, can have a separate logic for associating different threads with different requests. For example, the request manager 402 can serialize all thread pool method calls by wrapping the calls to the priority queue 401 in a synchronized statement, or a synchronized block 410, using a lock mechanism.

Thus, the operations on the priority queue 401 may be limited by the single-threaded design since the serialization is done outside the non-blocking priority queue 401.

Concurrent Priority Queue

Figure 5:
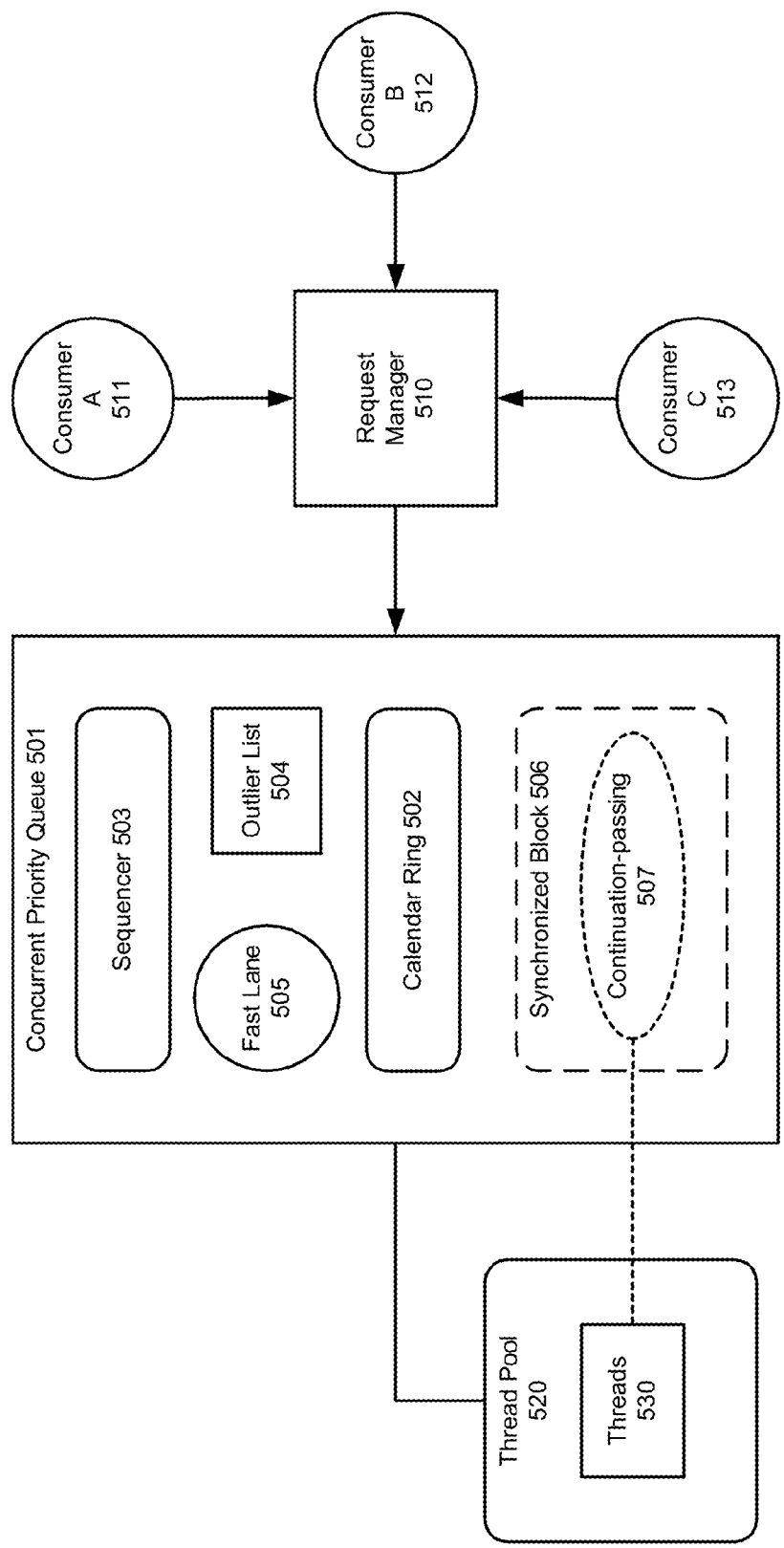
FIG. 5 shows an illustration of supporting a concurrent priority queue in accordance with various embodiments of the invention.

FIG. 5 shows an illustration of supporting a concurrent priority queue in accordance with various embodiments of the invention. As shown in FIG. 5, a plurality of consumers, e.g. consumer A-C 511-513 can concurrently access a concurrent priority queue 501 in a middleware machine environment 500.

The concurrent priority queue 501 can include a calendar, e.g. a calendar ring 502, which is capable of prioritizing and storing incoming requests. The calendar ring 502, the size of which is limited, can be configured to store requests that have a target response time within a preconfigured time limit. Within the calendar ring 502, a request can be stored, or placed, directly in the ring buffer at a position that matches Quality of Service (QoS) of the request, e.g. the target service time.

Thus, the system can achieve a much cheaper lookup for requests without changing the memory footprint of a calendar queue. Furthermore, the system can reduce the logarithmic complexity of the delete_min operation of the calendar queue to mostly a linear cache efficient search, while keeping the adding of elements to the calendar queue as O(1) operations.

Additionally, a request with a target service time higher than the preconfigured time limit can be added to a list of outliers, e.g. the outlier list 504. Since the scheduling of these requests may not be time critical, the system permits the slower addition to a sorted list of outliers 504. Furthermore, the concurrent priority queue 501 can use a sequencer, e.g. outliers_seq, to enforce a first-in-first-out (FIFO) order for the outlier list with the same QoS.

For example, the calendar ring 502 can be configured to store requests with a target response time (or QoS) below 2 seconds, since the requests with the QoS higher than 2 seconds can be considered rare. Furthermore, the requests with the QoS below 2 seconds can be placed in the calendar ring 502 that matches QoS, while the requests with the QoS higher than 2 seconds can be placed into the list of outliers 504.

Unlike the calendar queue as shown in FIG. 4, the request manager 510 does not need to put every call to the calendar queue 501 in a synchronized statement. The synchronized block 506, which supports continuation-passing 507, can be implemented within the scope of the concurrent priority queue 501. The consumers, e.g. consumers A-C 511-513, may not need to access the thread pool 520 from outside the concurrent priority queue 501.

Using continuation-passing, the system can transform the calendar queue 501 from non-blocking to blocking. The continuation-passing 507 can enable the consumers A-C 511-513 to manage the idle workers, or Threads 530, in the thread pool 520, so that the threads 530, which may be waiting in the thread pool 520, can be reused.

Additionally, the concurrent priority queue 501 can include a sequencer 503 that enables the concurrent priority queue 501 to detect contention and can use a fast lane 505 to support cooperative concurrency. Thus, the concurrent priority queue 501 can be aware of and handle the contention properly, without a need for the locks to expose knowledge about contention.

Add a Request into the Concurrent Priority Queue

Figure 6:
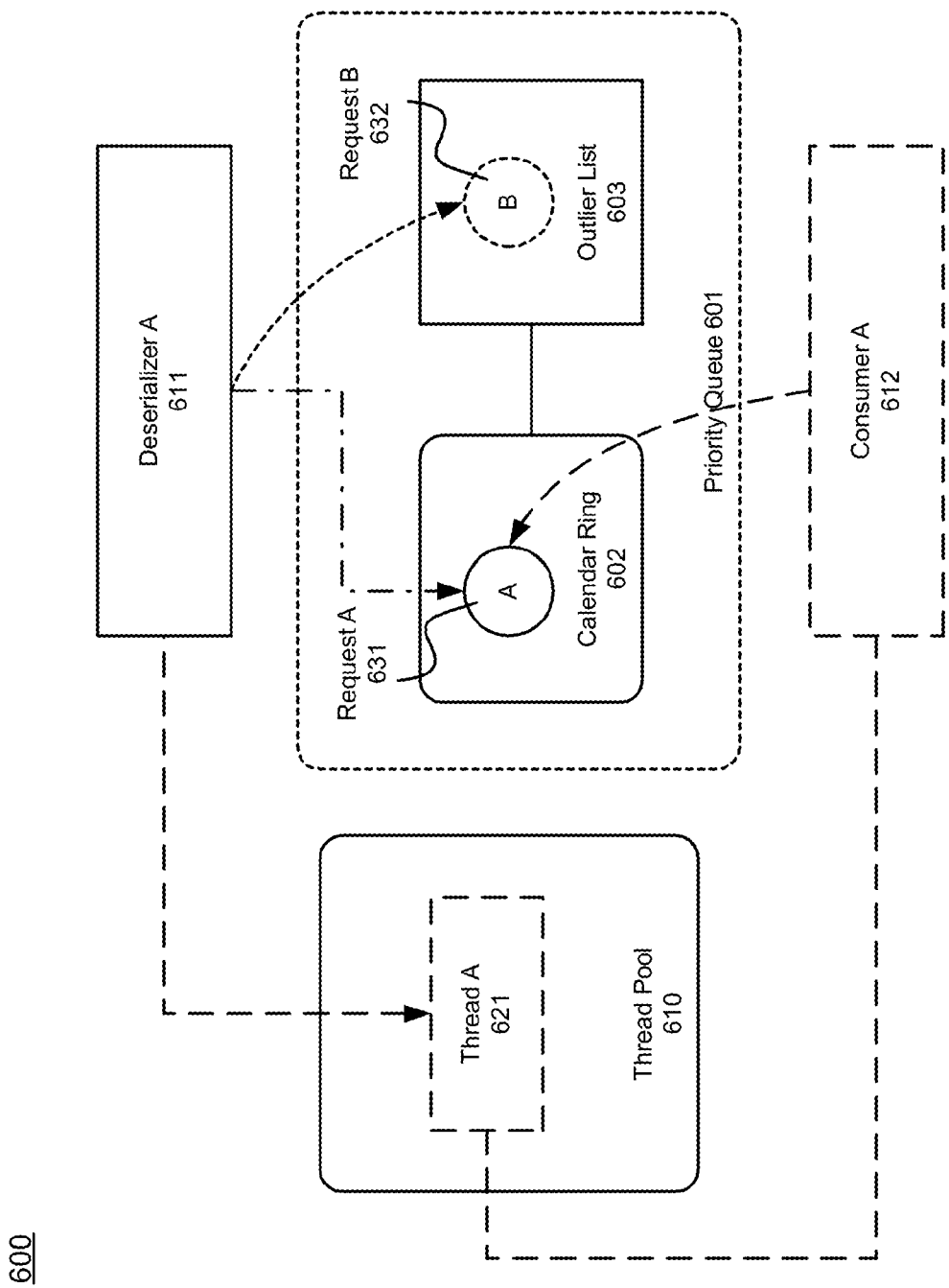
FIG. 6 shows an illustration of adding a request into a concurrent priority queue in accordance with various embodiments of the invention.

FIG. 6 shows an illustration of adding a request into a concurrent priority queue in accordance with various embodiments of the invention. As shown in FIG. 6, a priority queue 601 in a middleware machine environment 600 can include a calendar ring 602 and an outlier list 603. The priority queue 601 can be associated with a thread pool 610, which is not accessible from outside of the priority queue 601.

A caller, e.g. deserializer A 611, can add an incoming request, e.g. request A 631, into the priority queue 601. For example, when the incoming request has a QoS within a preconfigured time limit, the deserializer A 611 can add the request A 631 into the calendar ring 602 directly. Otherwise, the caller can add the incoming request B 632, into the outlier list 603, when the QoS associated with the request is beyond the preconfigured time limit.

Additionally, when the priority queue 601 is empty, the priority queue 601 can wake up a thread, e.g. thread A 621, in the thread pool 610 (also referenced to as a waiter list or waiter pool). Then, a consumer, e.g. consumer A 612 that is associated with the thread A 621, can be aware of the addition of the request A 631 in the calendar ring 602 and proceed to consume the request A 631 in a timely fashion.

In accordance with one embodiment of the invention, the concurrent priority queue can use the continuation passing feature to allow a caller to manage thread in the thread pool 610. Additional information about continuation passing is disclosed in pending U.S. Patent Application titled "SYSTEM AND METHOD FOR TRANSFORMING A QUEUE FROM NON-BLOCKING TO BLOCKING", application Ser. No. 13/781,500, filed Feb. 28, 2013.

Claim a Request from the Concurrent Priority Queue

Figure 7:
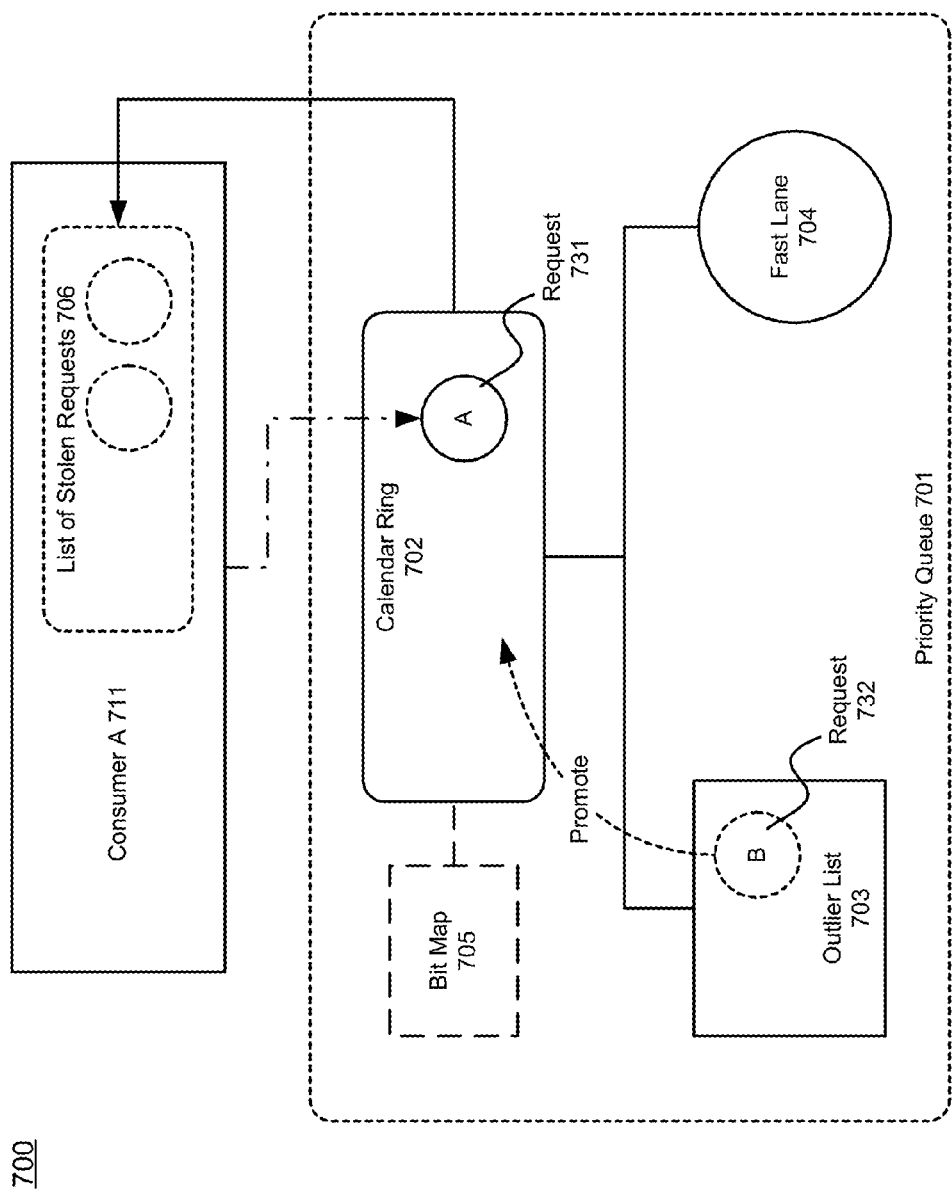
FIG. 7 shows an illustration of claiming a request from a concurrent priority queue in accordance with various embodiments of the invention.

FIG. 7 shows an illustration of claiming a request from a concurrent priority queue in accordance with various embodiments of the invention. As shown in FIG. 7, a consumer, e.g. consumer A 711, can claim one or more requests, e.g. request A 731, from the concurrent priority queue 701 in the middleware machine environment 700. The concurrent priority queue 701 can include a calendar ring 702, an outlier list 703 and a fast lane 704.

A bit map 705 can be created and updated to be in synchronization with the calendar ring 702. When consumer A 711 tries to claim request A 731 from the calendar ring 702, the bit map 705 can be used for scanning the calendar ring 702 in order to improve efficiency of the calendar ring 702. For example, instead of examining references in the calendar ring 702, a bit scan operation on a simple bit map can be used to analyze a large number of entries (e.g. 64 entries) in the calendar ring 702.

Furthermore, the concurrent priority queue 701 can promote one or more requests, e.g. request B 732, from the outlier list 703 into the calendar ring 702, when the calendar ring 702 is empty.

Additionally, when the workload is intensive, there is a good chance that multiple requests can fall into the same calendar entry, or bucket, in the calendar ring 702. A list of stolen requests 706 can be used to reduce contention caused by claiming such requests in the calendar ring 702. Furthermore, the list of stolen requests 706 can become longer when more requests land on the same calendar entry. Thus, by taking into the list of stolen requests 706 a list of requests fallen into a single entry in the calendar ring 702 as a whole, the consumers can serialize access to the calendar ring 702 less frequently.

In accordance with various embodiments of the invention, the concurrent priority queue 702 can maintain the fast lane 704, which can be used for supporting cooperative concurrency.

Cooperative Concurrency

Figure 8:
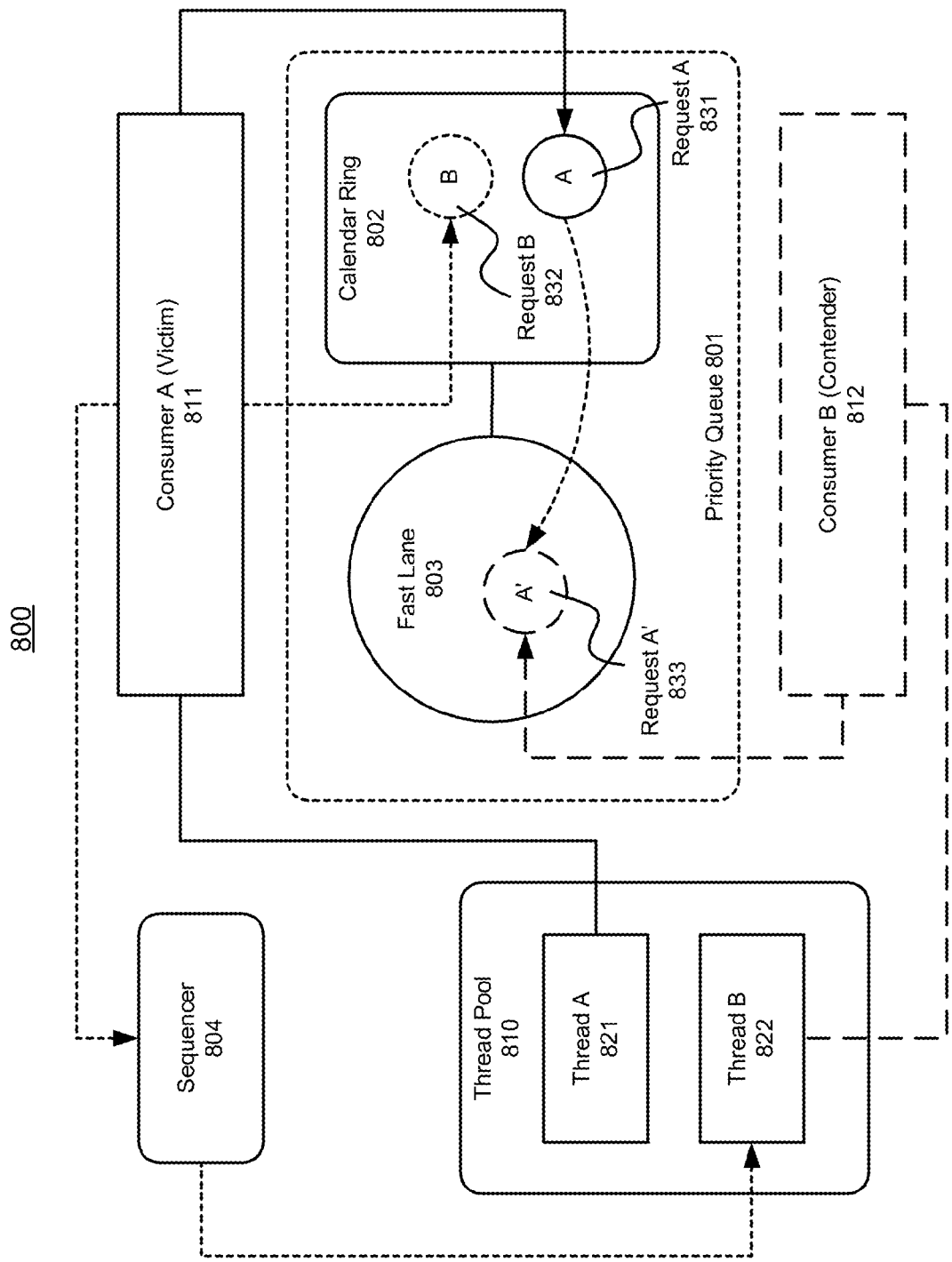
FIG. 8 shows an illustration of supporting cooperative concurrency in a priority queue in accordance with various embodiments of the invention.

FIG. 8 shows an illustration of supporting cooperative concurrency in a priority queue in accordance with various embodiments of the invention. As shown in FIG. 8, the middleware machine environment 800 can include a priority queue 801 that can be accessed concurrently by a plurality of consumers, e.g. consumers A-B 811-812. The priority queue 801 can include a calendar ring 802 and a fast lane 803. The priority queue 801 can also use a thread pool 810, which may not be accessible from outside of the priority queue 801. Here, each of the consumers A-B 811-812 can be related to a thread, e.g. thread A-B 821-822, in the thread pool 810.

A sequencer 804 can be used by a victim, e.g. consumer A 811, to detect a contender, e.g. consumer B 812, for the priority queue 801. Additional information about using a sequencer in a priority queue is disclosed in U.S. Patent Application titled "SYSTEM AND METHOD FOR USING A SEQUENCER IN A CONCURRENT PRIORITY QUEUE", application Ser. No. 13/781,493, filed Feb. 28, 2013, and subsequently granted as U.S. Pat. No. 9,110,715 issued on Aug. 18, 2015.

In accordance with various embodiments of the invention, the priority queue 801 can reduce contention between the consumers A-B 811-812, by employing a cooperative concurrency strategy.

As shown in FIG. 8, after detecting a contention, the victim, e.g. consumer A 811, can place a request, e.g. request A 831, into a fast lane 803 (as request A' 833), and proceed to claim another request in the calendar ring 802, e.g. request B 832, if it is available. In the meantime, consumer A 811 can release a contending thread, e.g. thread B 822, in the thread pool 810, which allows the contender, e.g. consumer B 812, to eventually claim the request A' 833 from the fast lane 803.

Furthermore, when there are multiple contenders, the victim 811 can control the accessibility of requests in the fast lane 803 by controlling the maximum number of contenders that may be released. This is because a request can be claimed by a contender from the calendar ring 802 at a position, fastLane_w, only when the contender can set an index, fastLane_r, equal to fastLane_w (fastLane_r=fastLane_w). Since each contender may only increase fastLane_r by one, the contenders can increase the value of fastLane_r only by the number of contenders that are released.

Using the cooperative concurrency, the concurrent priority queue 801 can improve wait times, e.g. reducing the average wait time for various contenders. Additionally, the cooperative concurrency can improve CPU cache locality of the concurrent priority queue 801, since one victim consumer can do more work single-threadedly.

Figure 9:
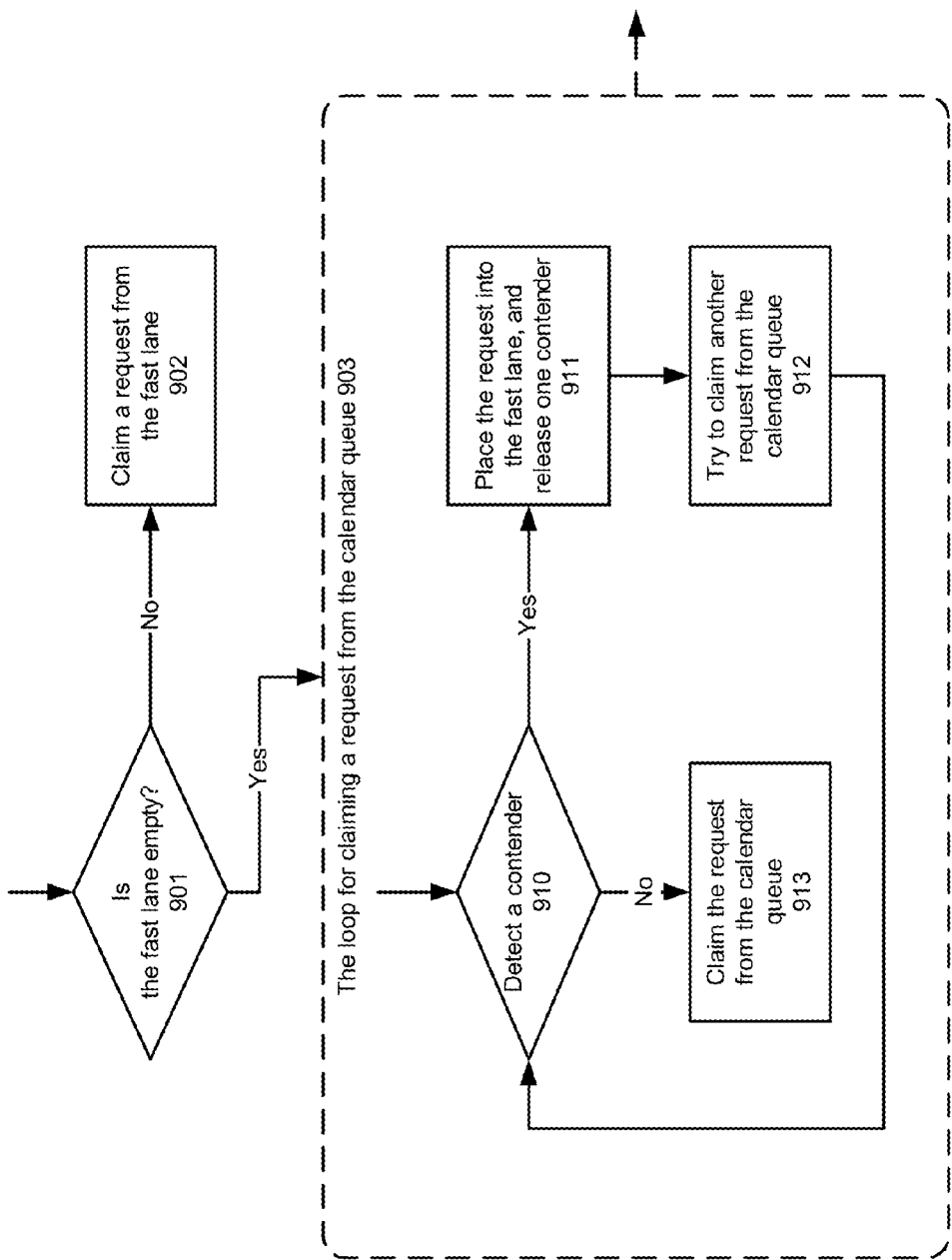
FIG. 9 illustrates an exemplary flow chart for claiming a request from a priority queue in accordance with an embodiment of the invention.

FIG. 9 illustrates an exemplary flow chart for claiming a request from a priority queue in accordance with an embodiment of the invention. As shown in FIG. 9, at step 901, the caller, such as a consumer or a request manager, can first check whether the fast lane is empty.

At step 902, if the fast lane is not empty, the consumer can attempt to claim a request from the fast lane. If the claim of a request from the fast lane fails, then there is another consumer that has successfully claimed the request. Eventually the consumer can either claim a request, or observes the fast lane is empty, in which case there are no more consumers in delete_min.

At step 903, if the fast lane is empty, the caller can proceed to the loop for claiming a request from the calendar queue. The loop for claiming a request from the calendar queue can include multiple iterations. At the beginning of each iteration, the caller can try to locate the first list of requests in the calendar array, and the caller can attempt to take the first request from the list.

At step 910, the caller can check whether there is a contention, e.g. by checking whether the readers ticket in the sequencer has been advanced beyond the last known free value at the sequencer.

Then, at step 913, if the caller detects no contention, then the consumer can proceed to claim the request from the calendar queue.

Otherwise, at step 911, if the caller detects contention, the consumer can cooperatively place the request in the fast lane, and can release one contender. As long as this consumer is inside delete_min, the released contender can eventually claim a request from the fast lane.

Furthermore, at step 912, since the request is given away to a contender, the consumer attempts to claim the next request in the calendar ring. This may lead the consumer to the step 910, which is at the beginning of another iteration in the loop.

Eventually, either the queue becomes empty, or no contenders are detected, or the fast lane is deemed full. When the fast lane is deemed full, the consumer can break the loop, update the size of the queue, and release one more contender, which will be able to eventually enter the loop for claiming requests outside the fast lane.

Figure 10:
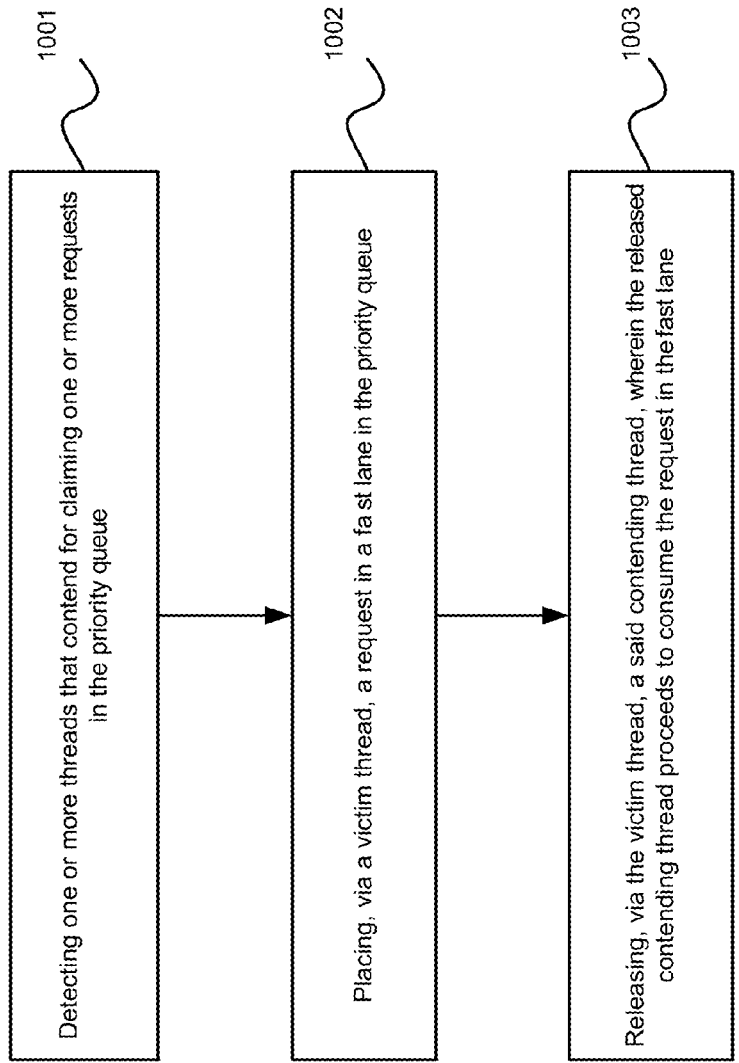
FIG. 10 illustrates an exemplary flow chart for supporting cooperative concurrency in a priority queue in accordance with an embodiment of the invention.

FIG. 10 illustrates an exemplary flow chart for supporting cooperative concurrency in a priority queue in accordance with an embodiment of the invention. As shown in FIG. 10, at step 1001, the system can detect one or more threads that contend for claiming one or more requests in the priority queue. Then, at step 1002, a victim thread can place a request in a fast lane in the priority queue. Furthermore, at step 1003, the victim thread can release a said contending thread that is blocked in a thread pool, wherein the released contending thread proceeds to consume the request in the fast lane.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting cooperative concurrency in a priority queue of a middleware system, the priority queue including a calendar ring area that queues requests according to target response time and a lane area that queues requests moved from the calendar ring area to the lane area due to contention between consumers, the method comprising, with the middleware system, performing the method of:
    detecting that a first thread that is associated with a first consumer and a second thread that is associated with a second consumer contend to claim a request in the priority queue; and
    handling the contention without locks to expose the contention, the handling including:
        placing, by the first thread, the request from the calendar ring area that is under contention into the lane area of the priority queue;
        releasing, by the first thread, the second thread; and
        consuming the request in the lane area, by the second thread that is associated with the second consumer.

2. The method according to claim 1, wherein the requests stored in the calendar ring area have a target response time less than a pre-configured quality of service (QoS).

3. The method according to claim 2, further comprising:
    specifying the pre-configured quality of service (QoS) to be two seconds.

4. The method according to claim 2, further comprising:
    using a bit map updated in synchronization with the calendar ring area for faster scanning.

5. The method according to claim 2, further comprising:
    associating a list area of the priority queue with the calendar ring area, wherein the list area operates to store requests with target response time longer than the pre-configured quality of service (QoS).

6. The method according to claim 5, further comprising:
    promoting a request in the list area into the calendar ring area, when no request can be found in the calendar ring area.

7. The method according to claim 2, further comprising:
using a list of requests to reduce contention on the calendar ring area when workload is intensive, wherein the list of requests contains one or more requests that land on a same calendar entry.

8. The method according to claim 1, further comprising:
using a sequencer to order the contending threads.

9. The method according to claim 1, further comprising:
proceeding, by the first thread, to claim another request in the calendar ring area.

10. The method according to claim 1, wherein:
supporting continuation-passing when the priority queue is empty.

11. A system for supporting cooperative concurrency in a priority queue, comprising:
one or more microprocessors of a middleware system;
a priority queue that runs on the one or more microprocessors, wherein the priority queue includes a calendar ring area that queues requests according to target response time and a lane area that queues requests moved from the calendar ring area to the lane area due to contention between consumers, and the priority queue operates to:
  detect that a first thread that is associated with a first consumer and a second thread that is associated with a second consumer contend to claim a request in the priority queue; and
  handle the contention without locks to expose the contention, the handling including:
    placing, by the first thread, the request from the calendar ring area that is under contention into the lane area of the priority queue;
    releasing, by the first thread, the second thread; and
    consuming the request in the lane area, by the second thread that is associated with the second consumer.

12. The system according to claim 11, wherein requests stored in the calendar ring area have a target response time less than a pre-configured quality of service (QoS).

13. The system according to claim 12, wherein:
the pre-configured quality of service (QoS) is specified to be two seconds.

14. The system according to claim 12, wherein:
a bit map updated in synchronization with the calendar ring area is used for faster scanning.

15. The system according to claim 12, wherein:
the calendar ring area is associated with a list area of the priority queue, wherein the list area operates to store requests without the pre-configured quality of service (QoS).

16. The system according to claim 15, wherein:
a request in the outlier area is promoted into the calendar ring area, when no request can be found in the calendar ring.

17. The system according to claim 12, wherein:
a list of requests is used to reduce contention on the calendar ring area when workload is intensive, wherein the list of requests contains one or more requests that land on a same calendar entry.

18. The system according to claim 11, wherein:
a sequencer is used to order the contending threads.

19. The system according to claim 11, wherein:
the first thread proceeds to claim another request in the calendar ring area.

20. A non-transitory machine readable storage medium having instructions stored thereon that when executed cause a middleware system having a priority queue, the priority queue including a calendar ring area that queues requests according to target response time and a lane area that queues requests moved from the calendar ring area to the lane area due to contention between consumers, to perform the method comprising:
detecting that a first thread that is associated with a first consumer and a second thread that is associated with a second consumer contend to claim a request in the priority queue; and
handling the contention without locks to expose the contention, the handling including:
  placing, by the first thread, the request from the calendar ring area that is under contention into the lane area of the priority queue;
  releasing, by the first thread, the second thread; and
  consuming the request in the lane area, by the second thread that is associated with the second consumer.

* * * * *